350-358 SR

XR 3,575,550

[redacted]

[11] 3,575,550

[72] Inventor Adrianus Korpel
Prospect Heights, Ill.
[21] Appl. No. 746,826
[22] Filed July 23, 1968
[45] Patented Apr. 20, 1971
[73] Assignee Zenith Radio Corporation
Chicago, Ill.

[54] OPTICAL APPARATUS FOR DEVELOPING A FREQUENCY-DOMAIN SIGNAL
6 Claims, 4 Drawing Figs.

[52] U.S. Cl. ........ 178/7.1, 350/161
[51] Int. Cl. ........ H04n 5/44
[50] Field of Search ........ 350/161, 160, 162; 250/199, 211, 162; 178/5.4 (C), 7.1, 7.2 (E), 7.3 (E), 7.3 (D), 7.5 (E), 7.5 (D), 6 (S.P.); 315/22, 12, 27

[56] References Cited
UNITED STATES PATENTS 2,451,465 10/1948 Barney ........ 250/199
3,189,746 6/1965 Slobodin et al. ........ 350/161
3,482,105 12/1969 Hutzler ........ 250/199

*Primary Examiner*—Richard Murray
*Assistant Examiner*—Alfred H. Eddleman
*Attorney*—Francis W. Crotty

ABSTRACT: In a system for synthesizing frequency-domain video information, a composite video signal is developed in which frequency represents position of a picture element on an image and the amplitude of that signal represents picture or video amplitude at that position. To accomplish this, a vertically elongated band of light is caused to sweep in a horizontal direction; this may be achieved by sweeping a sheet beam of electrons across a luminescent screen. The light intensity is altered differently in individually different vertically separated portions of the band of light; a transparency exhibiting differences in transmission to the light in the vertical direction effects such alteration when placed in the path of the light. The light also is interrupted at individually different rates in individually different vertically separated portions of the band of light; a series of opaque stripes, fanned apart about a generally vertical axis and disposed in the path of the band of light, is illustrated as a means for accomplishing that result. Finally, a photodetector intercepts the altered and interrupted light and develops an electrical output signal that includes the desired frequency-domain video information.

3575550
NO OR CLASSIF

Inventor
Adrianus Korpel
By Francis W. Crotty
Attorney

OPTICAL APPARATUS FOR DEVELOPING A FREQUENCY-DOMAIN SIGNAL

The present invention pertains to optical apparatus. More particularly, it relates to apparatus for developing a frequency-domain video signal.

The conventional television reciever of today utilizes a cathode-ray tube in which an electron beam sweeps horizontally and vertically to define an image raster, while the beam intensity is modulated in amplitude to control the image brightness at any instantaneous position of the beam on the raster. Consequently, an individual picture element in the display is located by the amplitude and timing of the scanning signals, while the brightness of that picture element is determined by the amplitude of the video signal instantaneously when the electron beam is located at the position of the picture element. Thus, the entire information which defines the picture element is delivered simultaneously and the energy which governs the brightness of the picture must be delivered to the picture element in the very short time interval during which the electron beam is in a position on the picture element.

Other devices such as panels of electroluminescent cells also have been proposed to produce image displays. In general with respective to various different ones of such display devices, the incoming or addressing information is of a time-sequential character and the manner of addressing these display devices is of the same time-sequential type described above with respect to the cathode-ray tube. By thus requiring the entire energy for developing the picture element at any particular time-determined position to be delivered during the time interval corresponding to that position, a heavy burden is placed upon both the necessary characteristics of the display device and upon the requirements of the addressing apparatus.

My copending application Ser. No. 600,607, filed Dec. 9, 1966, and assigned to the same assignee as the present application, describes a display system which is addressed by frequency-domain signals. The signal frequency is determinative of position in an image of a given picture element and the amplitude of the signal at that frequency is determinative of the picture brightness at that position. Basically, the display system described in that application develops its image by deflecting a coherent light beam in a line across an image screen; the light beam is deflected by diffracting it through interaction with a moving series of acoustic waves. The frequency of those acoustic waves determines the angle of diffraction and, hence, the amount by which the beam is deflected. At the same time, the intensity of the acoustic waves of any particular frequency determines the amount of the light which is deflected by the waves at that frequency and hence the intensity of light which is directed to a particular position along the image line corresponding to that frequency.

The aforesaid copending application also discloses a coding system by means of which conventional video signals of time-sequential character may be converted to a frequency-domain character for use in addressing such a display device. Moreover, that coding system enables the development of an entire image line at once. That is, the different frequency signals corresponding to all of the different picture element positions along the image line are generated simultaneously and, therefore, may persist for the entire length of the normal time interval assigned in the overall image transmission system for a complete line trace. In this manner, a much brighter image may be developed for a given amount of peak light power because each picture element in a line is excited for that entire line-trace time interval. This contrasts sharply with the previously mentioned time-sequential approach wherein each picture element is excited only for the much smaller time interval corresponding to the fraction of the line trace during which the scanning beam is crossing the position of that picture element.

Thus, a major feature of addressing an image display device in terms of frequency is that each picture element may be energized for a period that may be several hundred times greater than is the case with time-sequential addressing. In recognition of this leading advantage, other and different apparatus previously has been disclosed for use in connection with frequency-domain image transmission systems. For example, in my additional copending application Ser. No. 689,542, filed Dec. 11, 1967, an optical processing system is disclosed that may function as a coding arrangement so as to be useable in place of the electrical quantizing system described in my application first mentioned above. In still another of my copending applications, Ser. No. 729,243, filed May 15, 1968, an optical system is disclosed for developing a frequency-domain video signal from a picture formed on a transparency or the like. In that system, a plurality of light beams pass through a transparency at respectively different positions, each of the different light beams having a unique frequency corresponding to its position at the transparency. The transparency attenuates the different light beams in accordance with the picture brightness at each different position, so that the light beams upon emerging from the transparency each still have their frequency that represents position while at the same time having an intensity that represents picture element amplitude or brightness. Detection of all of the light beams yields the desired frequency-domain video signal. Notwithstanding the foregoing and other prior proposals with respect to frequency-domain video transmission, there remains the ever-present desire for further flexibility of system and components and, at least in certain applications, the need for increased simplicity.

It is, accordingly, a general object of the present invention to provide new and improved optical apparatus that may advantageously be utilized in frequency-domain image transmission systems.

It is another object of the present invention to provide apparatus for developing electrical signals that include frequency-domain video information.

One specific object of the present invention is to provide a frequency-domain signal generator that, while optical in character, utilizes a position-controlled electron beam.

Optical apparatus in accordance with the present invention includes means for sweeping a vertically elongated band of light in a horizontal direction. The intensity of that light is altered differently in individually different vertically separated portions of the band of light. In addition, the light is interrupted at individually different rates in individually different vertically separated portions of the band of light. Finally, a photodetector responds to the light to develop an electric signal.

The features of the present invention which are believed to be novel are set forth with particularity in the appended claims. The invention, together with further objects and advantages thereof, may best be understood, however, by reference to the following description taken in connection with the accompanying drawings in the several FIGS. of which like reference numerals indicate like elements and in which:

As utilized herein, the term "light" includes optical radiation in both the visible and the invisible portions of the spectrum. In addition, the terms "vertical" and "horizontal" that are used with respect to directions in the apparatus as specifically illustrated are convenient in both the specification and claims to distinguish succinctly between orthogonally related movements. However, the use of those terms is intended only as a frame of mutual reference and they will be understood as not restricting in any way the actual orientation of the apparatus with respect to the earth or any other external frame of reference.

Figure 1:
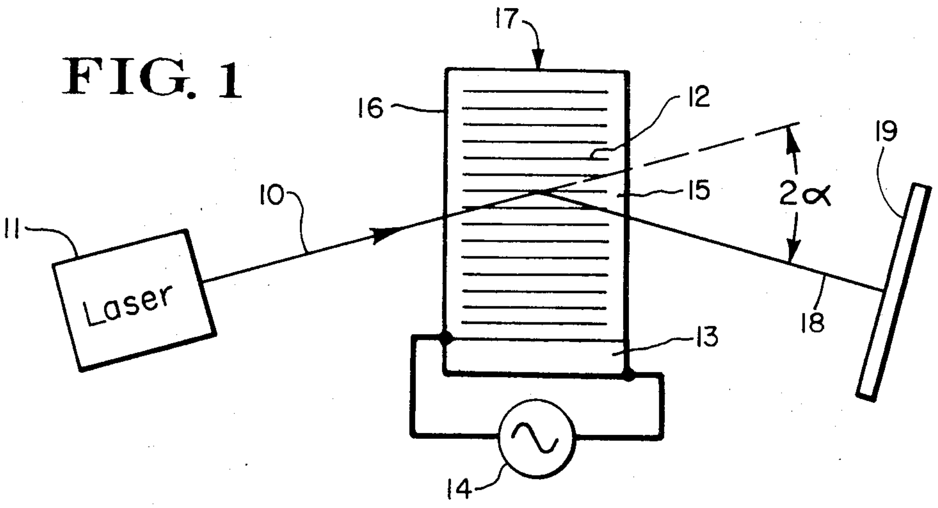
FIG. 1 is a schematic diagram of a known form of image display device suitable for use in a system incorporating the principles of the present invention.

FIG. 1 illustrates in simplified form an image display system described in more detail in my aforesaid copending applications and in other applications referred to therein. In this display system, a beam 10 of light is produced by a laser 11, the light having a wavelength λ. Propagating across the path of beam 10 are a series of sound waves 12 launched by a transducer 13 driven by a signal source 14. The sound waves, of wavelength λ, in a typical embodiment propagate in a medium 15 such as water confined within an enclosure 16 having sidewalls transparent to the light in beam 10. The entire sound-propagating assembly, here designated 17, has been frequently referred to as a sound cell.

When light beam 10 is incident upon the sound wavefronts approximately at the Bragg angle $\alpha$, a portion of the light beam emerging from cell 17 is diffracted along a path 18 forming an angle with the undiffracted beam portion of $2\alpha$. Bragg angle $\alpha$ is determined in accordance with the relationship:

$$\sin \alpha = X\lambda/2\Lambda. \qquad (1)$$

In a typical application, the actual value of angle $\alpha$ is sufficiently small that the left-hand term in the above equation is simply the angle $\alpha$ itself.

The diffracted light in beam 18 is projected, often by means of a telescope, upon an image screen 19. As will be evidenced from an examination of equation (1), the value of the diffraction angle is a function of the wavelength (or frequency) of the sound waves and, hence, is correspondingly a function of the frequency of the signals generated by source 14. As the sound wavelength decreases, the diffraction or deflection angle increases. Consequently, by scanning the sound frequency repeatedly through a given frequency range, returning the sound frequency to its beginning value at the end of each scan, the light beam may be caused to scan repeatedly across image screen 19. Utilizing this approach and intensity modulating the light beam in accordance with the amplitude of a video signal causes the video information to be displayed in terms of light image elements spread out across screen 19 in a line.

Thus, as in more conventional television systems, the light beam scansion may be synchronized with the original development of the video information. Of course to produce an actual television display in this manner, the system in FIG. 1 would also include means for deflecting light beam 18 in a direction orthogonal to the scanning direction illustrated in FIG. 1, so that a complete image raster is defined. However, for present purposes it is sufficient to consider in detail only the manner of display with respect to one of the two orthogonal directions.

In the manner of using the FIG. 1 apparatus as thus far discussed, the light beam emerging on path 18 is caused to scan an image raster in a time-sequential environment. As the beam scans each line of the raster, its image contribution is divided up into a succession of picture elements, fully analogous to the development of the picture elements along a line in a cathode-ray tube television display. The number of picture elements in such a system is a function of the overall resolution, a greater number of picture elements in a given line resulting in correspondingly greater detail being presented by the resulting image. The brightness of each element or group of elements relative to the next is a function of the video signal information introduced into the system and results in changes of shading across the display image that create the ultimate picture.

In this use of the system of FIG. 1, the change in brightness from one picture element to the next is caused by intensity modulation of the beam. To that end, a light-amplitude modulator (not shown) is disposed in beam path 10 between laser 11 and cell 17. That modulator may take the form of another sound cell in which the sound waves likewise are propagated across the light beam. In that case, the sound waves are produced by a signal source of constant carrier frequency with the carrier being amplitude modulated by the video information. Since the carrier frequency remains constant, the angle of diffraction of the beam by the modulation sound cell is constant, but the intensity of the light emerging from the sound cell is constant, but the intensity of the light emerging from the sound cell is modulated as a function of the modulation on the carrier frequency. Consequently, as beam 18 is caused to scan screen 19 in such a system, the intensity of the light in the beam varies along the scanning lines in accordance with the time-synchronized variation in the amplitude of the input video signal.

In operation of the system as just described, the development of each picture element occurs entirely during the very short time interval when the scanned beam is located at the position of that picture element, or at most at the position of a few picture elements. As explained in the introduction, that approach has a number of limitations. However, that mode of operation has been discussed to afford suitable background. Attention will now be directed to the more advantageous frequency-domain mode of operation for which the FIG. 1 device also is suited.

While the apparatus depicted in FIG. 1 represents but one of a variety of image display mechanisms which may be incorporated into an overall system employing the frequency-domain approach, it is incorporated herein because of its simplicity and the fact that, as such, its basic mode of operation is now rather well understood in the art. A particular characteristic of the FIG. 1 apparatus, which it shares with other display mechanisms utilizable with the image-processing techniques disclosed hereafter, is that the position on screen 22 of picture elements being addressed at any given time is a function of the frequency of an applied signal.

For one particular angle of diffraction $\alpha$, between emerging light beam 18 and the plane of the sound wavefronts, light impinges upon screen 19 at a nominal or center position as illustrated. This position corresponds to a particular frequency of the sound. At this position, the diffracted light also is of a given intensity, and hence the brilliance of the spot formed on screen 22 is likewise of a given intensity as determined by the amplitude of the souund waves in cell 17 by which the light is diffracted. If, then, the frequency of the sound signal from source 14 is increased so that the sound wavelength is decreased, the exit angle $\alpha$ is likewise increased so that the spot formed on screen 22 is moved to a position toward the lower end of screen 19 in FIG. 1. Again, the intensity of this new spot is a function of the amplitude of the amplitude of the sound signals of this new frequency.

Now, if source 14 simultaneously develops two signals individually of different frequency and amplitude, cell 17 will correspondingly deflect two light beams at respective angles $\alpha_1$ and $\alpha_2$ which in turn develop corresponding spots spaced along screen 19 in the direction of the scanning line. The two spots will individually have respective amplitudes corresponding to the respective amplitudes of the two signals applied to source 14. Up to a maximum limit determined by the resolution $N$ of the system, the number of signals simultaneously developed by source 14 may be increased to any number as the result of which cell 177 diffracts a corresponding plurality of beams to produce a like plurality of spots distributed across screen 19. Each of the spots has an intensity or a brightness corresponding to the amplitude of its respective signal produced by source 14. Further details of interest to the overall frequency-domain transmission system and with respect to such matters as resolution, tolerances in terms of position and time and the like are explained more fully in the aforementioned prior applications. Being thus available to the person desiring to design and develop an overall system, they need not be further discussed herein.

Figures 2, 3, 4:
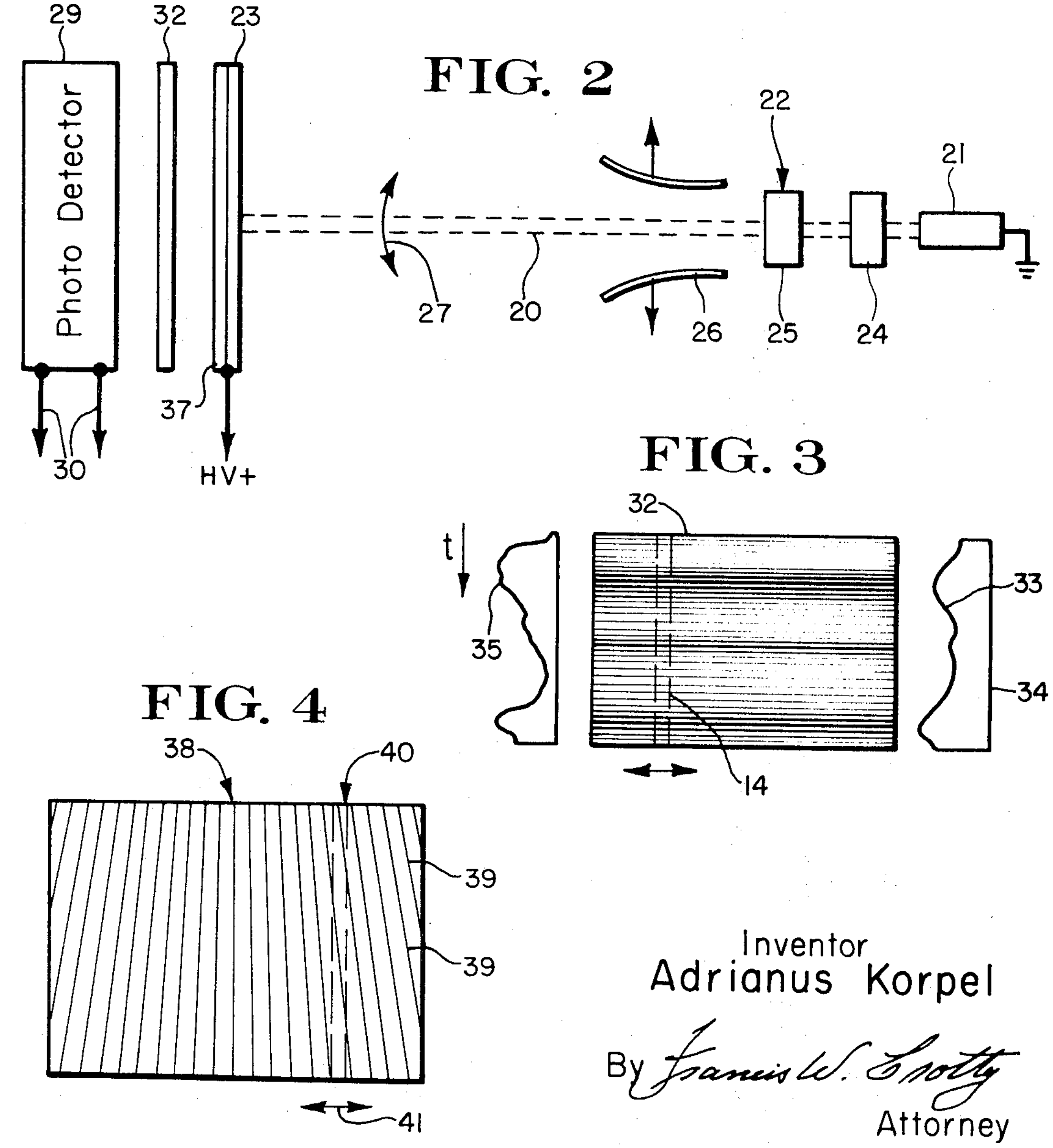
FIG. 2 is a schematic diagram of optical apparatus for developing electrical signals of frequency-domain character that represent video information.
FIG. 3 is an elevational view of a component included in the apparatus of FIG. 1 together with a pair of related amplitude diagrams that are useful in explaining the character of the component shown.
FIG. 4 is an elevational view of another component included in the apparatus of FIG. 2.

Turning now to the apparatus of FIG. 2, a vertically elongated sheet beam 20 of electrons is developed by a cathode 21 and projected by an electron gun 22 to a luminescent screen 23. Electron gun 22 includes focusing, accelerating, and deflecting electrodes 24, 25 and 26. Except for the fact that electron beam 20 is elongated in the vertical direction, into and out of the plane of the drawing, the apparatus as thus far described is conventional in every respect, being like an oscilloscope tube or cathode-ray tube in its function of sweeping a beam of electrons across a luminescent screen in a horizontal direction as indicated by arrow 27. In response to excitation by the moving rectangular-shaped beam of electrons, a band of light oriented vertically is produced by screen 23 and likewise sweeps across that screen in the horizontal direction. Beyond screen 23 is a photodetector 29 disposed to receive light from all of the different positions, over the width of screen 23, traversed by the moving band of light. Detector 29 responds to the light to develop electrical signals across its output terminals 30.

Additionally included in the apparatus of FIG. 2 is means for altering the intensity of the light differently in individually different vertically separated portions of the band of light. To this end, the embodiment illustrated in FIG. 2 includes an optical filter or transparency 32 disposed between screen 23 and photodetector 29. Filter 32 attenuates the intensity or amplitude of the light passing through it at any point by an amount depending on the neutral density of the filter at that position. Variations in that density at different vertically separated regions in the filter thus differently alter the intensity in individually different vertically separated portions of the band of light emerging from the filter and incident upon photodetector 29.

Filter 32 is further illustrated as the rectangle in the center of FIG. 3. The different densities of shading across the filter in the vertical direction correspond to differences in neutral density of the filter. Those differences in neutral density are also depicted by curve 33 drawn at the right-hand side of FIG. 3, the distance of any point in curve 33 from a vertical axis 34 representing that neutral density level. At the same time, curve 35, at the left-hand side of FIG. 3, illustrates the amplitude of an equivalent time-sequential video signal, as it changes in amplitude through a time interval plotted from top to bottom, over one horizontal scanning line of an image.

Thus, a portion of the band of light from screen 23 that passes through filter 32 in a region having a high neutral density is substantially attenuated by the filter; the band of light is indicated by dashed lines 36 in FIG. 3, and it sweeps in a horizontal direction as indicated by the associated arrows. At the same time, a portion of the light band at a different vertical elevation where it traverses a region of the filter having a lower neutral density is attenuated by a lesser amount. Of course, the neutral density image line recorded upon filter 32 may be either positive or negative relative to an equivalent video signal. That is, its portion of greatest density may correspond either with an amplitude peak or an amplitude valley of the video information. As shown, the particular image is of the negative type corresponding to negative polarity video transmission of the equivalent video signal. For reasons to become clear subsequently, it may also be noted that the density at any vertical position across filter 32 is constant throughout its horizontal width. It should also be kept in mind that the band of light in FIG. 2 sweeps horizontally, while the video information recorded on filter 32 is distributed vertically.

In terms of its essential elements, the apparatus of FIG. 2 finally includes a component 37 for interrupting the light at individually different rates in individually different vertically separated portions of the band of light produced by screen 23. As particularly illustrated, component 37 is disposed in the path of the light between screen 23 and photodetector 29, and specifically in this instance ahead of filter 32. Moreover, component 37 herein takes the form of a mask 38 having a plurality of light-opaque elements 39 disposed with different horizontal spacing in the paths of respective different ones of the vertically separated portions of the band of light. As shown in FIG. 4, elements 39 define a series of stripes fanned apart so as to be closer at the top than at the bottom. Consequently, the band of light, illustrated by dashed lines 40 in FIg. 4 and which sweeps horizontally as indicated by arrow 41, is simultaneously intercepted in different vertically separated portions by the wires and at different rates.

A little study of FIG. 4 will reveal that elements 39 interrupt the light in a manner to cause detector 29 to yield an electrical output signal that simultaneously contains all frequencies corresponding to the number of intersections of the band of light with the elements in terms of time, i.e., the number of such intersections per second. This may be seen by first considering only a small portion of the light sweeping horizontally across the top of element 38. That light portion is interrupted at a certain rate depending upon the scanning frequency and the spacing of the opaque elements along the top, and the interruption of the light in turn develops an alternating signal in the photodetector output at a certain frequency corresponding to the interruption rate. Next, a small portion of the band of light sweeping across the bottom of element 38 is seen to be interrupted at a slower rate since at the level the opaque elements 39 are spaced farther apart. Consequently, the resulting electrical signal exhibits a lower frequency corresponding with the lower rate of interruption. Taking into account all of the different rates of interruption over the vertical distribution of the band of light, it will be further seen that a plurality of signals are developed that exhibit a range of frequencies and that each different signal frequency corresponds to an individually different vertical distance across or vertical height on mask 38. Correspondingly, each different signal frequency corresponds to a different vertical position on filter 32.

In this way, then, the electrical signals appearing across terminals 30 each exhibit a unique frequency corresponding to a position along a horizontal scanning line (having here a vertical direction on the filter), and the intensity of each signal at each frequency correspondingly represents video amplitude at the position represented by the corresponding frequency. Hence, by connecting terminals 30 in place of source 14 in FIg. 1, light beam 18 is caused to produce a horizontal scanning line in which the position of each picture element is determined by the frequency of the signal from photodetector 29 and the light intensity at that position, a function of the corresponding density in filter 32, is determined by the amplitude of the signal at that frequency. In practice, for use with display apparatus such as that shown in FIG. 1, the density of elements 39 in mask 38 is chosen together with the velocity of the scanning beam so as to develop signal frequencies in a range of the order of from 13 MHz. at the bottom to 23 MHz. at the top.

The particular apparatus illustrated in FIGS. 2, 3 and 4 has been preferred as the illustrative embodiment both because of its simplicity and because of its ease of explanation. At the same time, it os to be recognized that, at typical television scanning speeds, the production of one horizontal image line after the next would require seemingly unreasonable rates of change of filters 32 between image lines. Nevertheless, this version is applicable to a number of different situations. By forming filter 32 to be but one of a succession of density images spaced along a film or strip, like successive frames of a motion picture film, the apparatus is adaptable to so-called slow scan television such as that sometimes used in various closed circuit systems and rather extensively used in space exploration. Even then, the movement rate of the film may be decreased by selecting the vertical height of the band of light and of mask 38 such that several frames on the film are scanned at once, as a result of which several successive image lines may be scanned simultaneously. Of course, this requires separation of the individual different frequency ranges corresponding respectively to the different image lines and appropriate delay of the subsequent line information for use in respective succession by the FIG. 1 display apparatus. Analogously, the apparatus is adaptable to use as a slow speed converter, such as may be employed in video recording, for changing between time-sequential and frequency-domain video information. In any event, it is to be noted that one feature of the illustrated system is the storage of an entire line of video information and the subsequent simultaneous development of that entire line as an electrical video signal. As indicated, previously, this has decided advantages in terms of image display, since it permits each picture element in that line to persist for the entire line trace interval assigned.

The depicted system also is intended, in terms of each of the individual components, to illustrate a number of alternatives. For example, instead of sweeping electron beam 20 across luminescent screen 23, cathode 21 may be replaced by a direct source of a sheet beam of light which then is swept back and forth across mask 38 and filter 32. In either case, it is to be recognized that mask 38 may perform its function of interrupting the light by being placed in any one of several different points in the arrangement. That is, mask 38 may in FIG. 2 alternatively be disposed following filter 32 or it may be placed ahead of image screen 23 so as to interrupt the electron beam and thus only effectively interrupt the band of light. Moreover, it is also to be noted that the shape of the pattern defined by elements 39 in the mask may be changed in order to alter the overall frequency distribution characteristics in any manner that may be desired either for special applications or to compensate for nonlinearities in the ultimate display system.

As additional alternative, it is to be recognized that filter 32 may be arranged so as to operate in either a transmission or a reflection mode. That is, the variations in that component may be recorded with changes in the vertical direction in terms of differences in reflectivity, the components then being rearrangeed so that photodetector 29 receives the light reflected by filter 32. Particularly applicable to this reflection mode is the substitution, for the neutral density filter illustrated of an image storage screen. Available image storage devices, such as a so-called dark trace scope, "paint" an image on a luminescent screen in the form of a "transparency" where it is caused to persist for a selected length of time. By causing that persistence time to correspond with a single line trace, the image information for that line may then be erased and the next succeeding line caused to be displayed.

As a still further alternative to the use of neutral density filter 32 is specifically illustrated, the different vertically separated portions of the sheet beam are directly modulated with correspondingly different amplitudes. In one such approach, a light-sound interaction cell similar to cell 17 of FIG. 1 is employed by creating a standing wave pattern of acoustic waves that exhibit different amplitudes at different positions across the height of the sheet beam.

The foregoing demonstrates a wide variety of applications and adaptations all of which incorporate the underlying principles of the overall FIG. 2 system. While that system as specifically described is advantageous in certain applications because of the possibility of using state-of-the-art small oscilloscope-type tubes to perform the sweeping function, it has been alternatively shown that the entire system may be composed of light devices. In any case, the components themselves are individually simple in nature and the overall apparatus need not be highly sophisticated. It, therefore, is of distinct interest for use in image transmission systems of the frequency-domain type so as to achieve all the benefits of frequency-addressing a display device and particularly the benefit of the capability of producing a picture element for a much longer period of time than heretofore possible when using a time-sequential addressing mode.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. Optical apparatus comprising:
- means for sweeping a vertically elongated band of light in a horizontal direction;
- means for altering the intensity of said light differently in individually different vertical separated portions of said band;
- means for interrupting said light at individually different rates in individually different vertically separated portions of said band; and
- means, including a photodetector responsive to said light to develop an electric signal, disposed in the path of said light beyond said altering and interrupting means.

2. Apparatus as defined in claim 1 in which said sweeping means comprises:
- means for developing a sheet beam of electrons;
- a luminescent screen disposed in the path of said beam; and
- means for deflecting said beam across said screen.

3. Apparatus as defined in claim 1 in which said altering means includes a medium disposed in the path of said light and in individually different vertically separated portions thereof transmissive of said light in different amounts.

4. Apparatus as defined in claim 1 in which said altering means differently alters said intensity in correspondence with changes in video amplitude along a line of picture elements of an image.

5. Apparatus as defined in claim 1 in which said interrupting means includes a mask having a plurality of light-opaque elements disposed with different horizontal spacings in the paths of respective different ones of said portions of said band.

6. Apparatus as defined in claim 5 in which said elements define a series of stripes fanned apart about a generally vertical axis.